April 29, 1969  M. K. HANNIFAN ET AL  3,441,316

RECOVERY OF METAL VALUES BY LEACHING

Filed July 6, 1967

INVENTOR
MARTIN K. HANNIFAN
JAMES BALLARD
BY

ATTORNEYS 3,441,316
RECOVERY OF METAL VALUES BY LEACHING
Martin K. Hannifan and James Ballard, Butte, Mont., assignors to The Anaconda Company, New York, N.Y., a corporation of Montana
Filed July 6, 1967, Ser. No. 651,592
Int. Cl. B21c 41/08; B21b 21/00; C22b 3/00
U.S. Cl. 299—5                                   11 Claims

ABSTRACT OF THE DISCLOSURE

Leaching of waste dumps and in situ deposits is accomplished by introducing the leach liquor through wells which are cased with liquid-impervious pipe and perforated at the levels where the liquor is to be delivered into the dump or deposit. Solution is delivered to the well heads through surface distribution ditches arranged to provide a basin at each well head, and provided with means to deliver leach solution at the desired rate into each basin. A header ditch supplies to the distribution ditches. Aeration of the leach solution is accomplished by allowing the solution to fall freely through the upper portion of the well and there induct and entrain air with it.

---

This invention relates to a novel leaching process for recovering metal values from a bed of metal-bearing materials. The process is particularly suitable for recovering copper values from a dump of mine waste containing copper-bearing materials and may be used also for recovering copper from a bed of copper-bearing ore deposits containing mineral zones below the ground surface such as mined-out block caving areas. The invention also provides an improved leaching system for recovering mineral values by use of the new process.

Copper values may be recovered from a dump of mine waste containing low grade copper ore by heap leaching which invloves building a pile of the ore and allowing water to percolate slowly through it. Iron pyrites in the heap become oxidized to ferric sulfate by the oxygen dissolved in the water. The $Fe_2(SO_4)_3$ in turn dissolves in the water and acts as a solvent for copper minerals in the heap. The copper-laden solution draining from the heap is collected and treated to precipitate its copper content in a subsequent cementation operation.

Heretofore the leach liquor has been introduced into the dump by various methods which usually involve spraying the leach solution over the surface of the dump with apparatus similar to lawn sprinklers or utilizing the irrigation principle by directing the water to flow from a header pipe into a series of parallel furrow ditches cut into the surface of the dump from which the solution seeped into the body of the dump. These methods lead to undesirable side effects, including, for example, (a) ponding caused by the formation of impervious layers, (b) channeling due in part to the settling of the dump after the water is applied and to the formation of impervious layers within the dump, both of which result in uncontroled directions of flow of the leach solution and limited distribution of solution within the dump and (c) erosion and sloughing of the dump side slopes caused by the horizontal flow of the water to the side dumps.

These prior methods have also been used to recover copper values from in situ beds of mineral deposits left in mined-out block caving areas. Here again channeling and other disadvantages of surface application of the leach solution are encountered. These disadvantages of surface application of the leach solution are encountered. These disadvantages reduce the effectiveness of the leaching operation and causes the production of low grade pregnant leach solution. A large area of copper mineralization usually is not reached by the leach solution, and therefore remains unleached. These methods are also ineffective for recovering copper in areas where an overburden of substantially impervious or acid consuming nature occurs above leachable mineral-bearing material.

The present invention provides a simple and yet an extremely effective leaching process for recovering metal values from a bed of metal-bearing materials. The novel process substantially overcomes the deficiencies of the prior methods stated hereinabove. Broadly stated the process involves the introduction of a leach solution into a plurality of wells of predetermined depth located in the bed. The solution is directed to flow outwardly in multiple directions from various depths, and rate of the outward flow which corresponds to the leaching rate may be regulated by the rate of delivery of the solution into the well. The metal-ladden solution is subsequently recovered by drainage from the bottom of the dump, or from below the in situ deposit, for further processing to precipitate the metal therefrom.

The wells usually are drilled substantially vertically down from the surface, but they may be drilled at any desired angle to the vertical. They may even extend horizontally from a sidewall of the dump, or from a hillside into an underground deposit.

The walls of the wells are advantageous substantially liquid-impervious to the depths at which solution is to be introduced into the dump or underground deposit. Wells drilled into dumps or broken ground are advantageously cased to hold them open, and the casing forms the liquid-impervious wall. If the well is bottomed at the level where the solution is to be introduced, the casing need not be perforated. Otherwise it is perforated at each such level.

The process may be advantageously used for heap leaching to recover copper from a dump of mine waste containing copper-bearing materials. It is carried out by introducing leach water into the wells at a rather low flow rate between about 0.1 and 2.0 gallons per square foot of dump area per hour. This flow rate should be kept low, and is generally not above 1 gallon per square foot of dump per hour. If the flow rate substantially exeeds the upper limit stated, very little leaching takes place. On the other hand, a rate substantially lower than 0.1 gallon per square foot per hour requires an excess leaching time. For a dump about 50 to 150 feet high, the preferred rate is about 0.25 to 0.35 gallon per square foot per hour which is equivalent to about 40 to 60 gallons of leach water per minute for a dump area measuring 100 feet by 100 feet.

The level of the leach solution in the well is maintained substantially below the surface opening of the well so the introduction of the leach solution by free-falling into the well effectively inducts air and mixes it with the solution, thus effectively providing oxygen for the leaching operation.

For leaching copper from a bed of copper-bearing ore deposits containing mineral zones below the ground surface, the process requires the introduction of leach solution to wells which direct the solution to flow outwardly therefrom at a depth just above and at various depths in the mineral zones.

The process of this invention preferably is carried out using a system which comprises a plurality of wells of predetermined depth located in the bed of metal-bearing materials. The walls of the wells are preferably made of substantially liquid-impervious material and have a plurality of openings disposed to permit introduction of liquid into the body of the dump at various depths. Ditches or other channels in the surface of the dump provided for directing a leach solution to the wells. Means may with advantage be provided to regulate the depth of the solution in the wells.

The leaching process and the system of this invention will be understood by referring to examples described below with reference to the accompanying drawings wherein FIG. 1 is a plan of a leaching system according to this invention;

Figure 1:
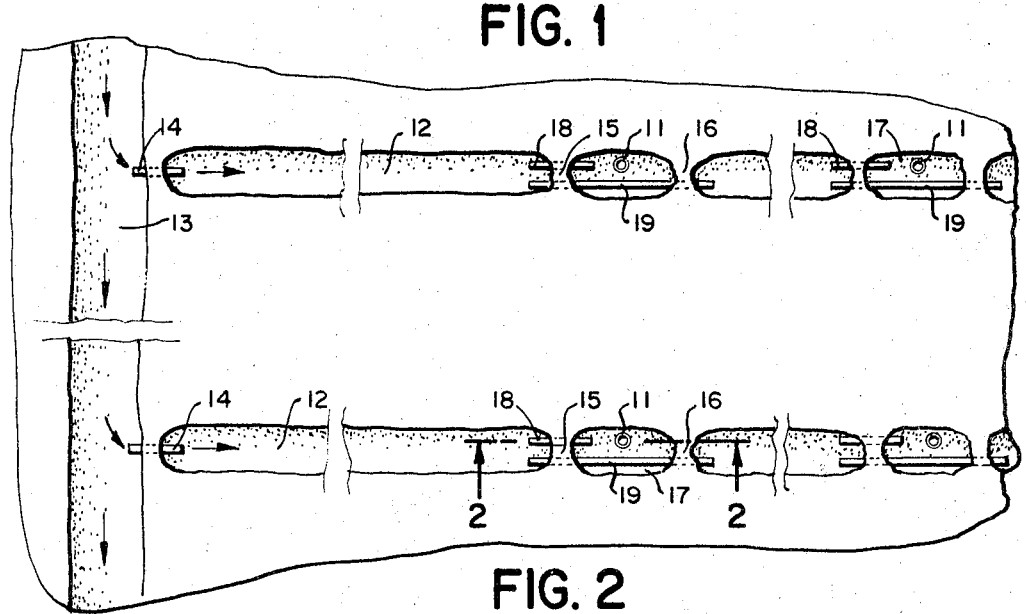
Figure 2:
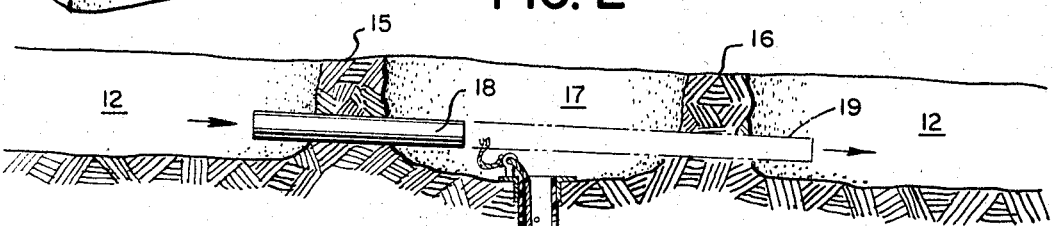
FIG. 2 is an enlarged fragmentary side view, partly in section, taken along line 2—2 of FIG. 1.

Referring initially to FIGS. 1 and 2, the system of the present invention for heap leaching of a dump 10 of mine waste includes a plurality of wells 11 suitably located in the dump and spaced apart from each other. The wells 11 preferably are prepared by making churn drill holes six inches in diameter in the dump to a depth ranged in diameter in the dump to a depth ranged from 20 to 120 feet. A high impact resistant polyvinyl chloride plastic pipe about 4 inches in diameter is lowered as a casing into the hole. These pipes are normally supplied in 20-foot lengths and may be thread-coupled to the desired length for the well. Depending on the depth of the wells, oftentimes it is advantageous to use a steel pipe casing to prevent the collapse of the newly drilled hole. Subsequently a PVC pipe casing may be inserted through the iron casing, and the latter may then be removed.

Figure 3:
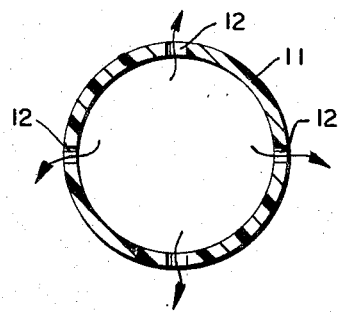
FIG. 3 is a cross section of the well casing taken along line 3—3 of FIG. 2.

The casing pipe 11 is perforated with sets of four ½ diameter holes 12 at 1 foot intervals along its full length. The four holes are evenly distributed around the periphery of the pipe (about 90° apart) as shown more clearly in FIG. 3. The provision of these holes in the pipe in the manner described allows the leach solution to flow outwardly in four directions at different depths within the dump.

The leach solution is supplied to the wells 11 by a plurality of interconnecting distribution ditches or channels 12 and 13 in the upper surface of the dump. These ditches or channels are spaced about 100 feet apart and are connected to a main supply or header ditch 13 by rubber or plastic pipes 14 which are selected as to diameter to control the flow of the leach solution at the desired rate into the distribution channels. The leach solution flows by gravity through the distribution channels to the wells 11.

In each distribution channel 12 two dams 15 and 16 are provided to form a basin 17 above at the well head of each well 11 along the length of the channel. A short pipe 18 allows leach solution to flow into the basin 17 from the upstream side of the distribution channel and into the well head opening into it. A longer pipe 19 serves as a by-pass for leach solution to flow into the distribution channel downstream of the well and on to the succeeding wells disposed along the distribution channels 12. Each pipe 18 may be selected as to diameter to serve as a flow control device for regulating the amount of leach solution to be introduced into the well 11 it serves.

A plug 20 may be provided in each well suspended by a polyethylene rope 21. The plug 20 serves more or less to control the level in the well at which leach solution flows into the material of the dump. By raising or lowering the plug 20 in the well, it is possible to exercise some measure of control over the level at which the leach water is to be introduced. Better control is effected, however, by bottoming the well at the desired level of solution introduction.

Instead of 4" polyvinyl chloride pipes, other pipes or tubes constructed of liquid-impervious and substantially acid resistant materials may be used. Generally polymeric pipes are preferred because of their light weight, rugged character, and acid resistance. The arrangement of the perforations in the pipe may be altered as long as it serves the general purpose of providing a multi-directional flow at various depths from the well into the body of the dump. The spacing of the wells also may be varied between, say 150-foot grid spacing at one extreme and a 25-foot spacing at the other extreme. In place of ditches, pipes of various diameter may be used to supply the leach water to the wells. Such a distribution system is more costly than ditches but permits regulating the flow of leach solution more effectively by allowing for the use of pumps and valves.

Effective leaching of copper-bearing ore is best accompanied by introduction of oxygen into the dump. This may be accomplished with particular effectiveness forcing air under pressure into one or more of the wells 11, or by using air exhaust fans housed in larger wells (not shown) cased with perforated plastic pipes to draw air into the dump through the wells 11, and through the dump side surfaces.

For recovering copper values from underground mineral zones, the location of the wells for the leach solution is determined from mine maps and records of production of, say, a block-caved mined-out area. The wells are drilled in a similar manner as described hereinbefore and are preferably cased with PVC pipes. During the drilling, when visual inspection of the cuttings indicates copper mineralization, standard sampling of hole cuttings are made at five to ten foot intervals. Depending on the depth and the length of the mineralization, the drilling may be stopped at about 10 to 30 feet above the undercut horizon. This usually allows proper drainage into openings below the leachable material, wherefrom the pregnant solution is recovered for further processing.

In casing the well, the perforated portions of the casing pipes are used only where the well passes through the mineralized zone. The perforations extend down from 10 to 15 feet above such zone to admit the leach solution at a proper level for optimum leaching efficiency. The rate of flow in each well depends on the several factors. In general, a rate less than 60 gallons per minute is preferred. If the flow rate is much above 60 g.p.m. relatively less effective use of the solution results. In one typical case, most effective leaching occurs when the flow is about 45 g.p.m. and the water builds up a head of possibly 20 to 50 feet above the perforated portion of the well.

Figure 4:
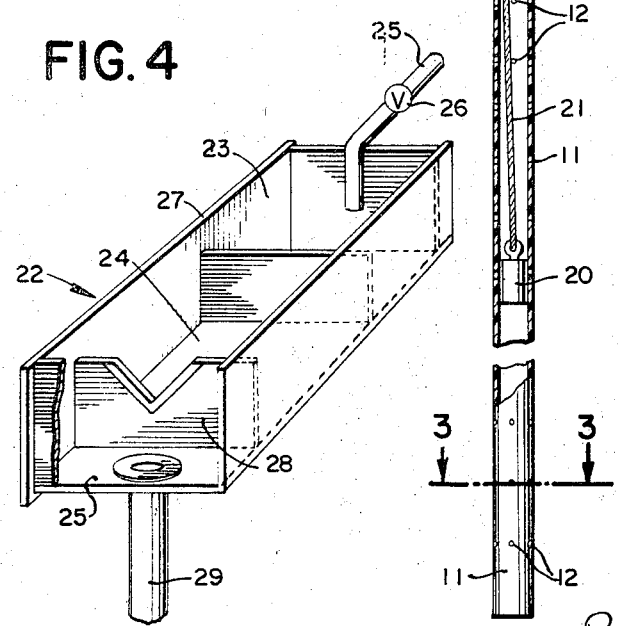
FIG. 4 is a perspective view of a flow measuring apparatus that may be used in the system of this invention.

To measure the flow rate a weir box 22 shown in FIG. 4 may be used. The box 22 is lead-lined and has three compartments 23, 24 and 25. The acid-bearing leach solution is introduced into one compartment 23 by a pipe 25 which is equipped with a valve 26 for regulating the flow. The leach solution overflows a stilling baffle 27 which separates compartments 23 and 24. The rate of flow of the solution into the well is measured by the height of its rise in a 90° notch stainless weir plate 28.

Since most mineralized zones are substantially below the surface, i.e., 200 to 400 feet, the well may be maintained at an optimal operating condition by filling with leach solution to a height less than 50 feet above the perforations, and maintaining a sufficient length of the pipe unfilled to allow the leach solution, in falling to the water level to induct and entrain air in the solution and thus introduce sufficient oxygen for the leaching operation.

The system of this invention provides efficient leaching without ponding and sealing effects encountered when using heretofore known dump and in situ leaching. It also permits the introduction of leach solution at various horizons to optimize the leaching efficiency and to minimize the effects of channeling. The use of perforated pipes permits the leaching of underground ore deposits having acid-consuming material above the ore bed, and the utilization of free-falling leach solution has the added advantage of providing greater aeration to the solution.

We claim:

1. A leaching process for recovering metal values from a bed of metal-bearing materials which comprises:

introducing a leach solution into each of a plurality of wells of predetermined depths located in said bed;

directing the solution to flow outwardly in multiple directions from various depths of the wells;

controlling the depth of said solution in the wells to regulate the leaching rate; and subsequent recovering the metal-bearing leach solution.

2. A leaching process according to claim 1, in which the bed of metal-bearing materials is a dump of mine waste containing copper-bearing materials.

3. A process according to claim 2 wherein the leach solution is introduced into said wells at a rate equivalent to about 0.1 to 1.0 gallons per square foot per hour.

4. A process according to claim 2 wherein air is circulated into the body of the dump through the wells.

5. A process according to claim 1, in which the bed of metal-bearing materials is a copper-bearing deposit in situ below the ground surface.

6. A process according to claim 5 wherein the level of the solution in the wells is maintained below the surface openings of the wells, the leach solution is introduced into said wells by free fall through the upper portion of the well, and oxygen is introduced into the material being leached by entrainment of air in the free-falling leach solution.

7. A process according to claim 5 wherein the leach solution is directed to flow outwardly from said wells above the zone of mineralization and at a flow rate below about 60 g.p.m.

8. A system for recovering copper values from a dump of mine waste containing copper-bearing materials which comprises:

a plurality of wells of predetermined depth positioned in said dump and spaced apart from each other, each of said wells being lined with casing of substantially liquid impervious material, the casing being formed with a plurality of openings distributed about the circumference and over at least a substantial portion of the length thereof;

distribution ditches in the surface of the dump for directing leach solution to said wells, each ditch serving a plurality of wells along its length;

each wellhead opening into a basin separated by a dam from the distribution ditch;

means for directing leach solution in regulated amount into each basin from the distribution ditch;

means for directing excess leach solution along the distribution ditch to succeeding wells downstream.

9. A system according to claim 8 wherein each of the wells is cased with a polymeric pipe having sets of openings distributed substantially equidistantly along the full length of the tube, the openings of each set being substantially equally spaced about the periphery of the pipe.

10. In a system according to claim 8, a plug slidably disposed within at least one of the wells for regulating the depth within the well at which the leach solution is directed into the body of the dump.

11. A system according to claim 8 wherein the distribution ditches are arranged to provide a continuous flow of leach solution to each of the wells from a main header ditch, in which short lengths of pipes of preselected size control the rate of flow of leach solution from the header ditch into each dsitribution ditch and from the distribution ditches into each wellhead basin.

References Cited

UNITED STATES PATENTS

| | | | |
|---|---|---|---|
| 1,908,876 | 5/1933 | Van Meter | 299—5 |
| 2,563,623 | 8/1951 | Scott | 299—5 X |
| 3,278,232 | 10/1966 | Fitch et al. | 299—4 |

ERNEST R. PURSER, *Primary Examiner.*

U.S. Cl. X.R.

75—101